United States Patent [19]

Atsukawa

[11] Patent Number: 5,279,084
[45] Date of Patent: Jan. 18, 1994

[54] MOVEMENT MECHANISM OF TELESCOPIC COLUMN

[75] Inventor: Masumi Atsukawa, Tokyo, Japan

[73] Assignee: Japan Skyrobot Co., Ltd., Tokyo, Japan

[21] Appl. No.: 877,756

[22] Filed: May 4, 1992

[30] Foreign Application Priority Data

May 17, 1991 [JP] Japan .................... 3-140771

[51] Int. Cl.$^5$ .................................... E04H 12/34
[52] U.S. Cl. ............................ 52/118; 52/111; 52/632
[58] Field of Search ............... 52/118, 632; 212/268, 212/269

[56] References Cited

U.S. PATENT DOCUMENTS

| | | | |
|---|---|---|---|
| 1,676,616 | 7/1928 | Lowy | 52/632 |
| 2,711,918 | 6/1955 | Benson | 52/632 |
| 3,280,527 | 10/1966 | Faust | 52/632 |
| 3,796,016 | 3/1974 | Wu | 52/118 |
| 4,062,156 | 12/1977 | Roth | 52 X/632 |
| 4,192,479 | 3/1980 | Friebe | 52 X/632 |
| 4,257,201 | 3/1981 | Landolt | 52 X/632 |
| 4,594,824 | 6/1986 | Ziegler | 52/118 |
| 4,657,112 | 4/1987 | Ream | 52 X/118 |
| 4,871,138 | 10/1989 | Sauter | 52 X/118 |
| 5,035,094 | 7/1991 | Legare | 52/118 |

Primary Examiner—Carl D. Friedman
Assistant Examiner—Beth A. Aubrey
Attorney, Agent, or Firm—Rogers & Killeen

[57] ABSTRACT

The invention provides a moving mechanism which can be made so small and lightweight as to be portable when being contracted, which can be formed into a longer higher column than conventional potable column, and which can thus realize a large moving amount without increasing the weight thereof. The movement mechanism has a slender moving member, a driving portion for moving the moving member, a plurality of centering members each having a through hole for the moving member at the center thereof, connected to each other and are moved in linkage with the movement of the moving member so that the distance between the respective centering members can be changed, and a movement passage for supporting and guiding the movement of the centering members.

12 Claims, 11 Drawing Sheets

MOVEMENT MECHANISM OF TELESCOPIC COLUMN

BACKGROUND OF THE INVENTION

The present invention relates to a forward and backward movement mechanism (referred to as "movement mechanism" hereinafter) which enables the assembly of a long column or the like by extension without increasing the weight thereof.

A movement mechanism using a hydraulic cylinder and a screw rod is generally widely used in the fields of a telescopic boom of a crane, a telescopic column, a jack and the like.

The known movement mechanism is designed so that the buckling strength of a forwardly and backwardly moving member (referred to as "moving member" hereinafter) is born by the constituent members themselves such as a cylinder, a rod, a screw rod and the like, which constitute the movement mechanism. The movement mechanism also has no means for enforcing these members. If a movement mechanism having a long moving length is formed, the weight of the mechanism is inevitably increased. Although a movement mechanism having a long moving length can be theoretically produced, practical problems with respect to the weight, portability, containment properties and the like cannot be solved.

A jib crane using the known movement mechanism has an extension length of about 20 to 30 m. However, such a crane is a type that it is loaded on an exclusive carriage track or crawler transporter. In the present situation, a screw rod type jack has a lifting amount of several m in balance between the backward length of the screw rod and the depth of the receiving pit.

This is because since no means is provided for the buckling strength of the conventional movement mechanism for a telescopic movement in spite of the most importance of the buckling strength for design of a slender structure, the dead weight of the mechanism is inevitably excessively increased. Although there is demand for a convenient, long and portable telescopic column, such a telescopic column has not been realized so far.

However, it is thought that a movement mechanism which enables the realization of a moving length extremely longer than that of a conventional mechanism without increasing the weight and which can be contained in a compact case is very useful for various industrial fields because a work of supporting a load at a height and a work of lifting a load to a height can be easily realized by such a mechanism.

SUMMARY OF THE INVENTION

Accordingly, it is an object of the present invention to provide a movement mechanism which is so small and lightweight that it can be easily transported when being contracted, which can be formed into a higher column than that of a conventional portable mechanism when being extended, and which thus enables the realization of a long moving length by a lightweight structure.

In order to achieve the object, the present invention provides a movement mechanism comprising a slender moving member, a driving portion for forwardly and backwardly moving the moving member, a plurality of centering members each having a through hole for the moving member, connected to each other and are forwardly and backwardly moved so that the distance between the respective centering members can be changed in linkage with the forward and backward movement of the moving member, and a movement passage for supporting and guiding the movement of the centering members.

DESCRIPTION OF PREFERRED EMBODIMENTS

Figure 1:
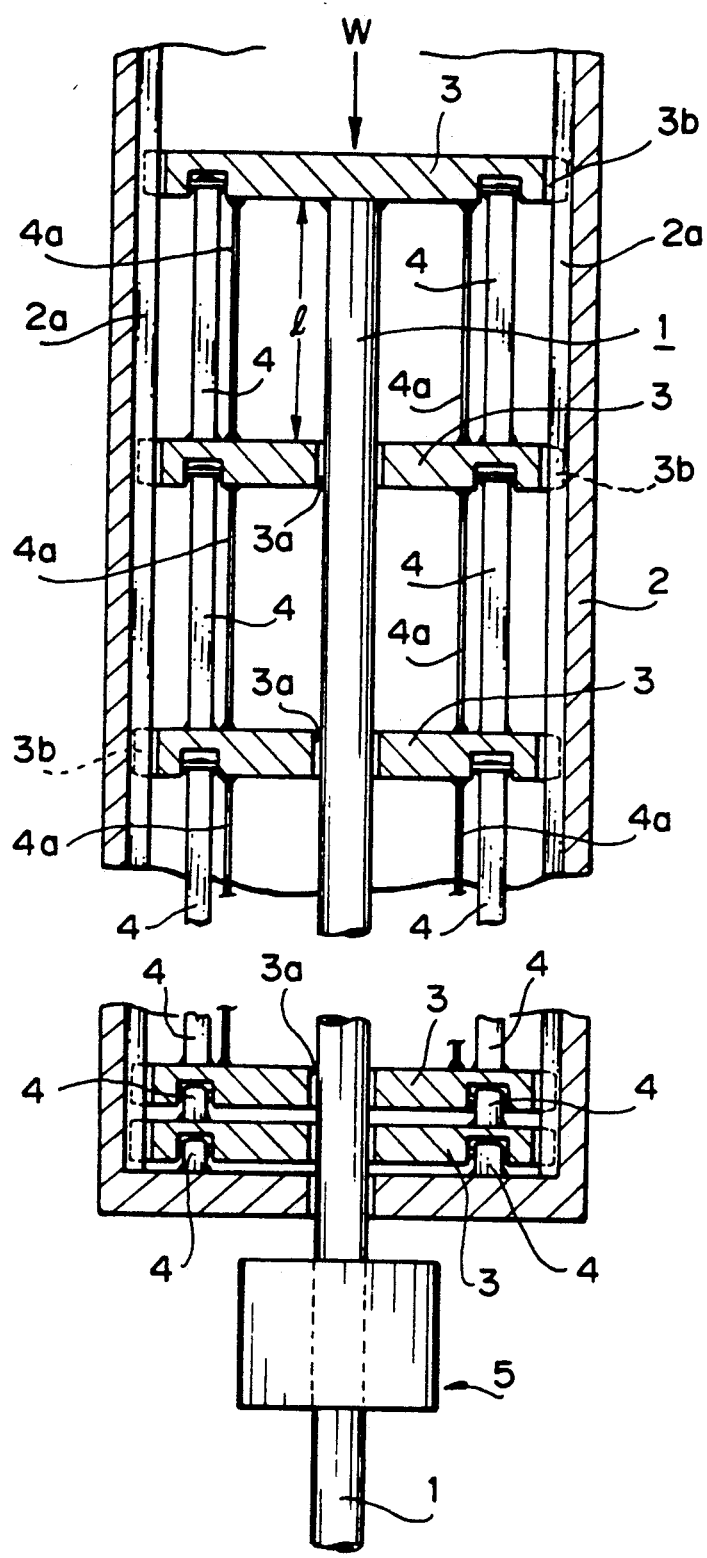
FIG. 1 is a sectional view partially showing an upward state of a load lifting mechanism formed by using an embodiment of a mechanism of the invention.
Figure 2:
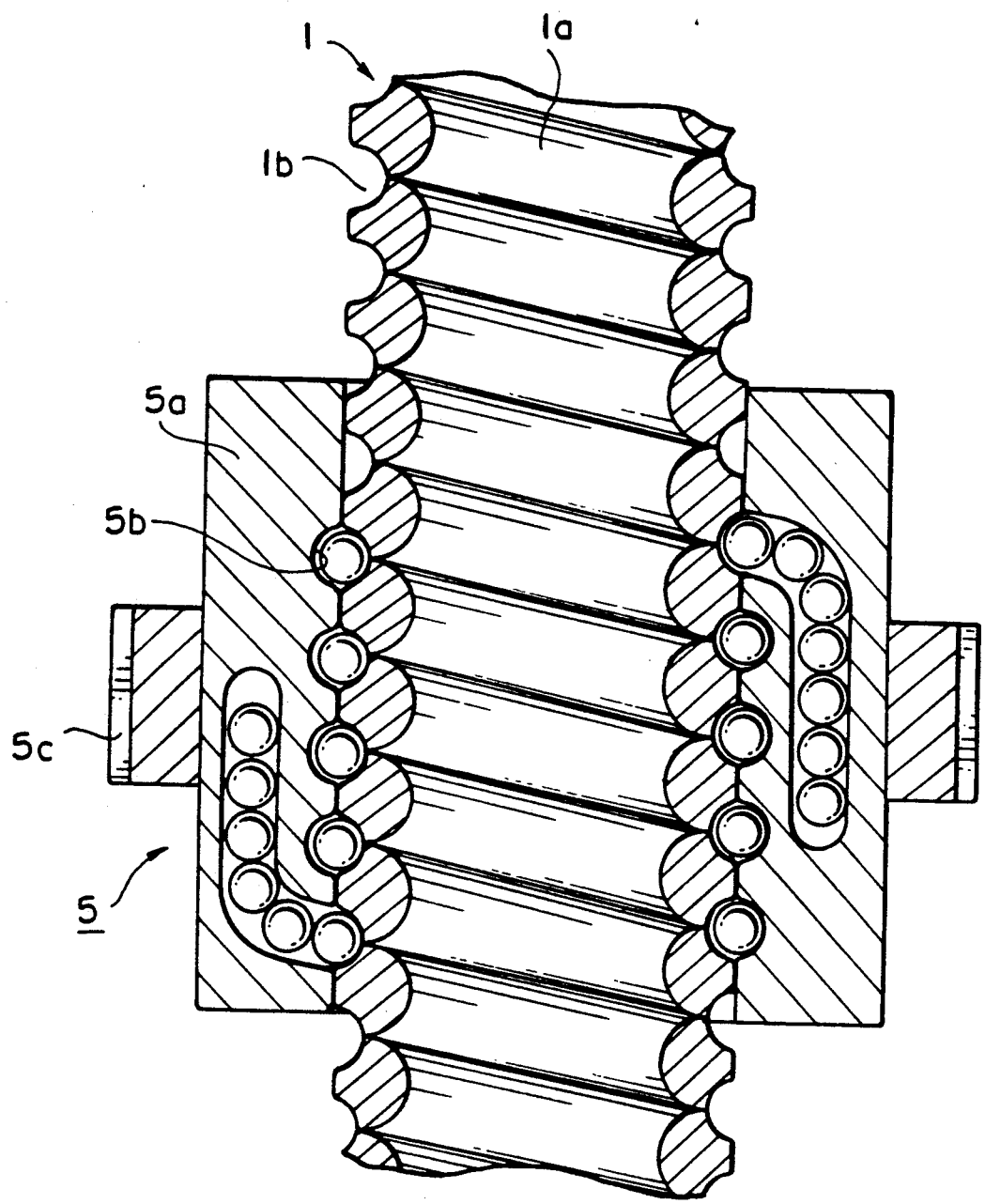
FIG. 2 is a front view showing a principal portion of an example of the flexible screw and the nut member used in a mechanism of the present invention.
Figure 3:
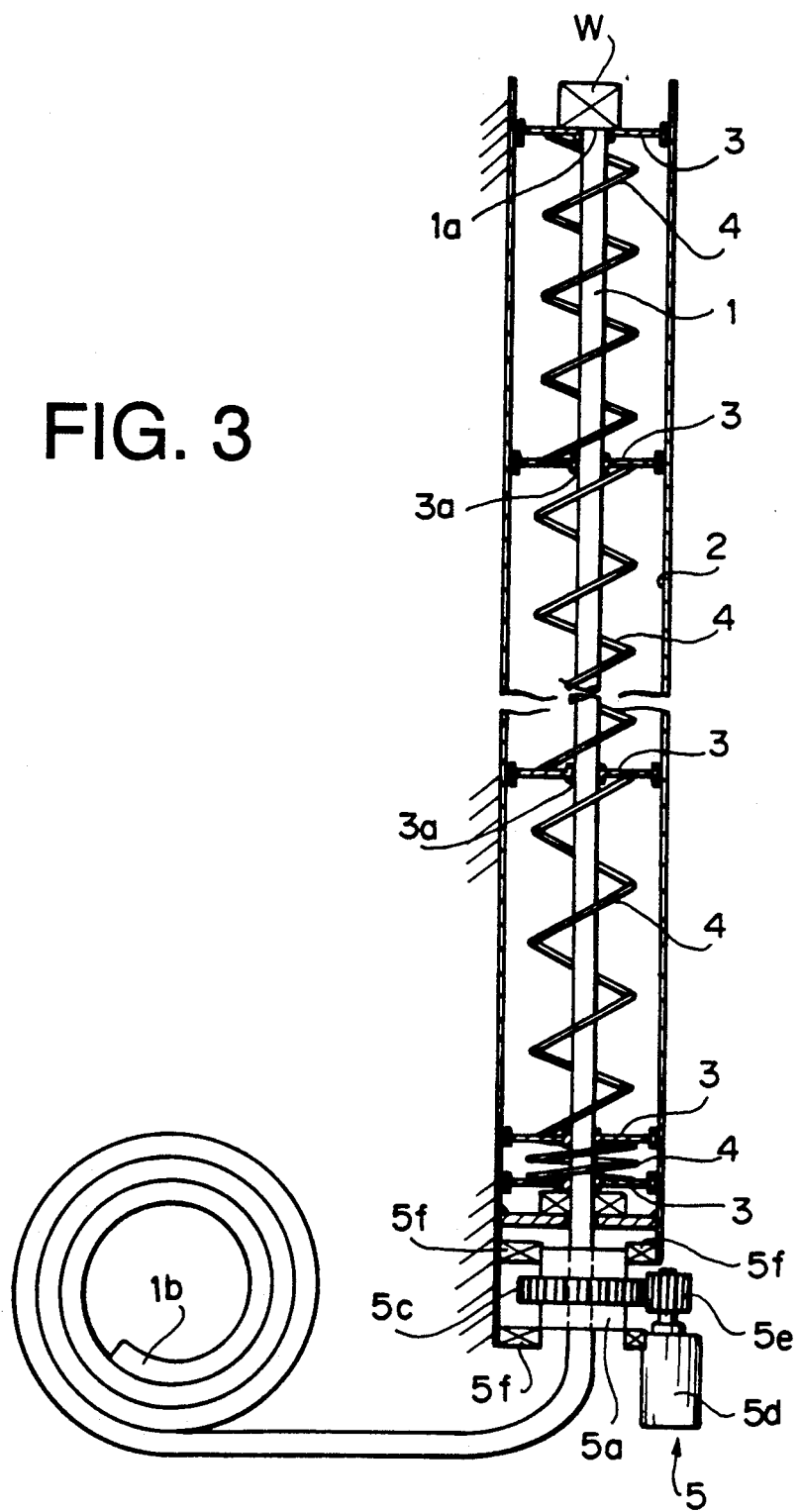
FIG. 3 is a sectional front view of another embodiment.
Figure 4:
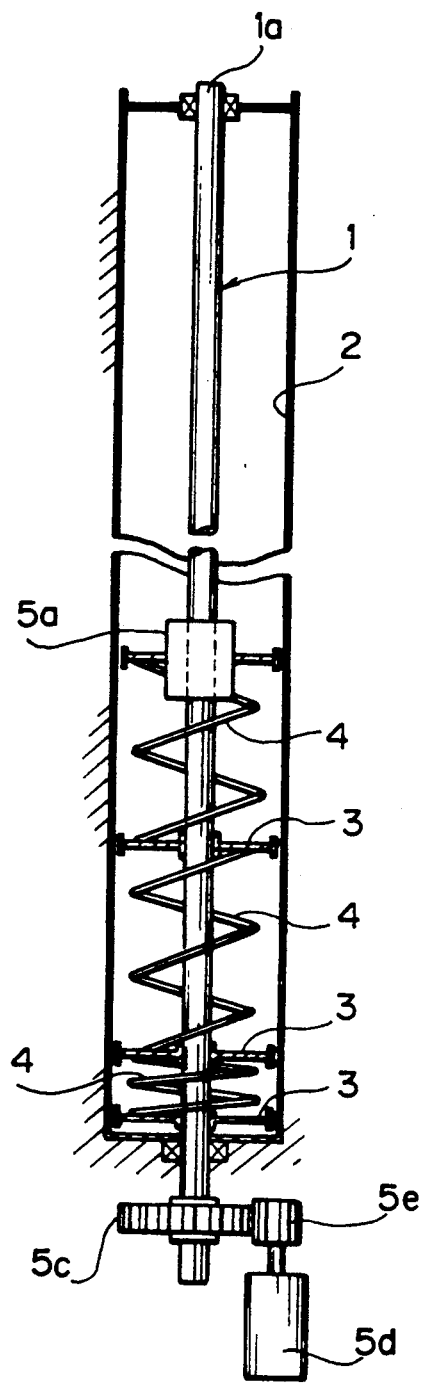
FIG. 4 is a front view of another example.
Figure 5:
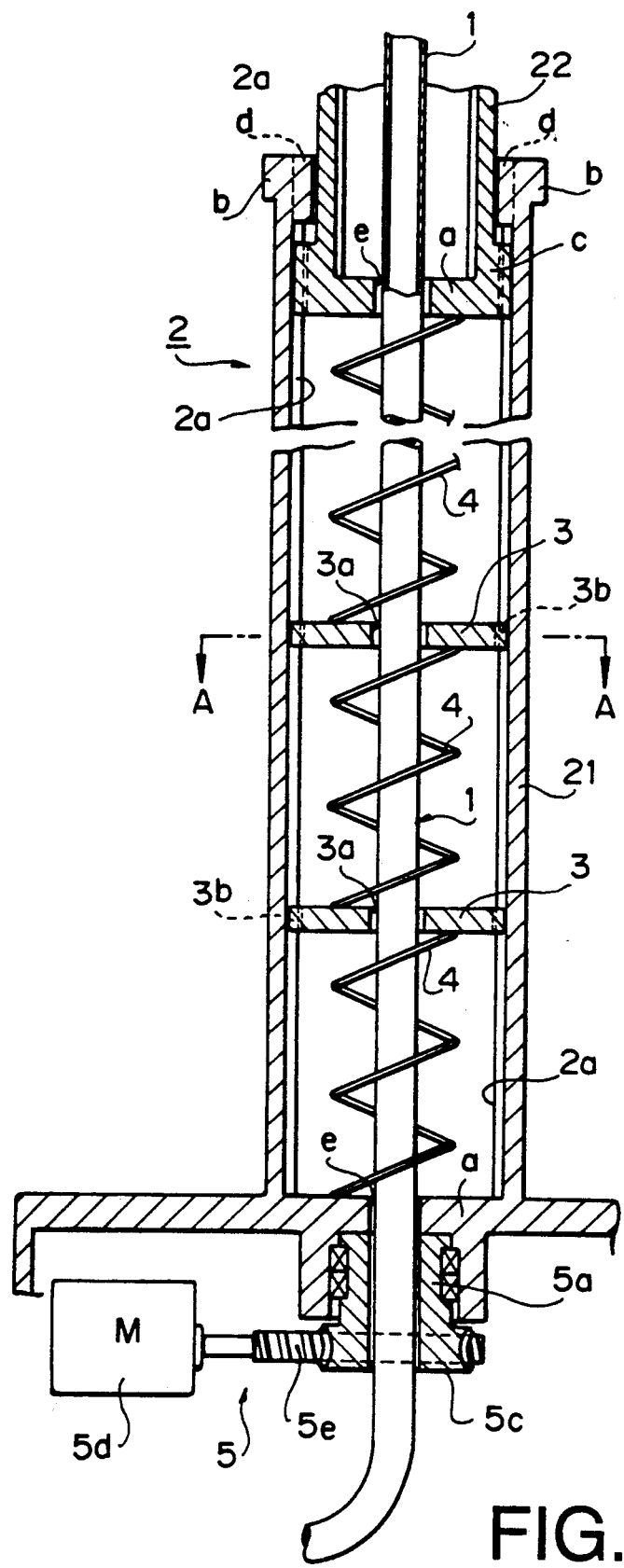
FIG. 5 is a sectional view showing a principal portion of an embodiment of a mechanism of the invention wherein a telescopic column is extended.
Figure 6:
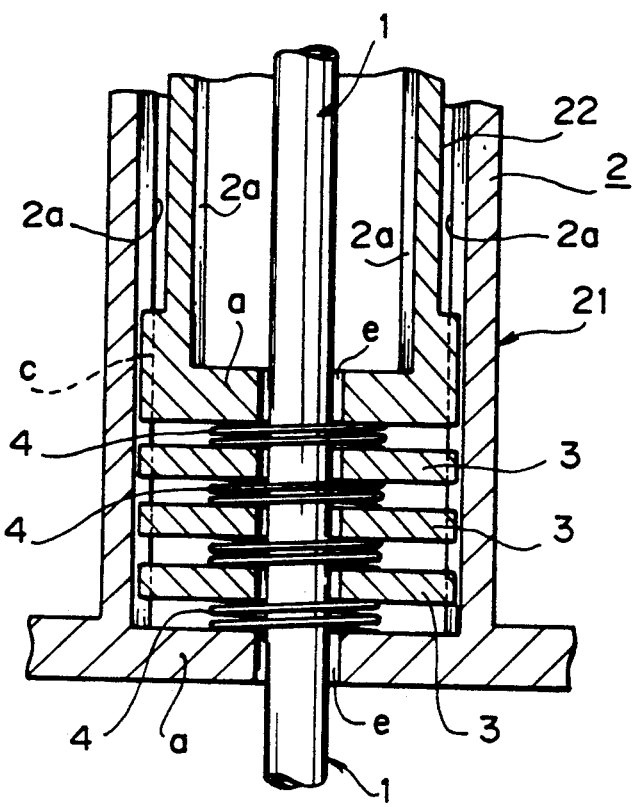
FIG. 6 is a sectional view of the same embodiment in the state wherein the telescopic column is contracted.
Figure 7:
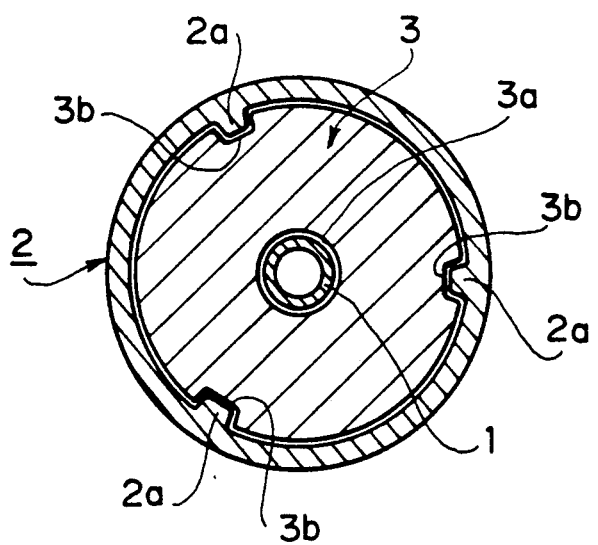
FIG. 7 is a sectional view taken along line A—A in FIG. 5.
Figure 8:
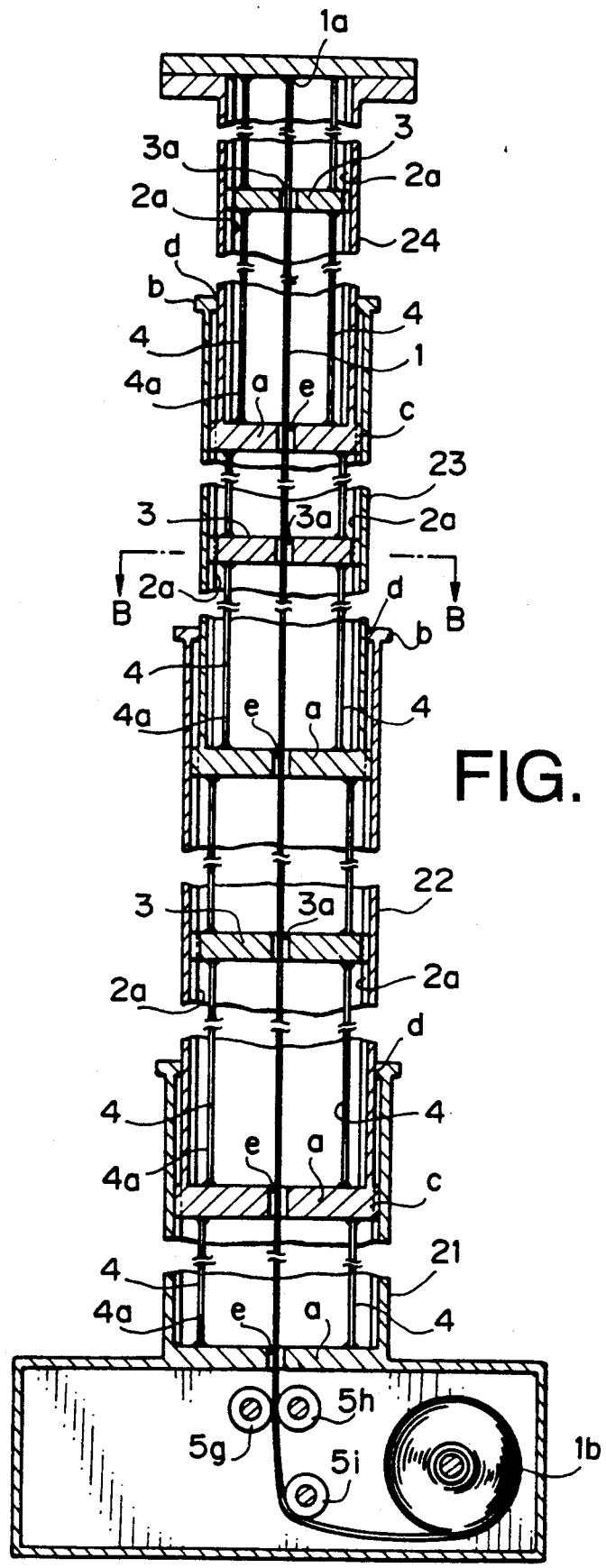
FIG. 8 is a sectional front view of a telescopic column formed by a further embodiment of a mechanism of the invention.
Figure 9:
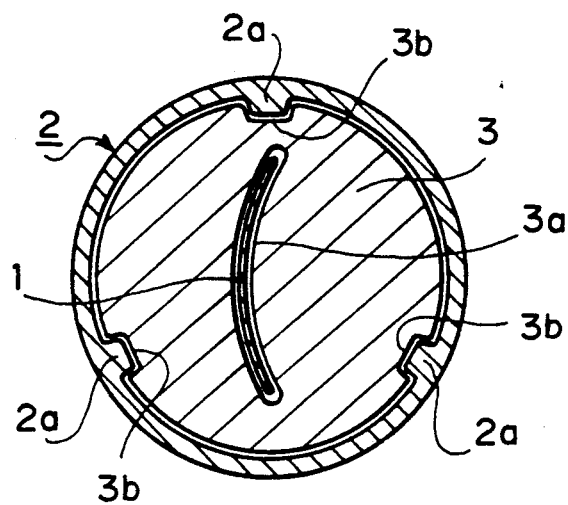
FIG. 9 is a sectional view taken along line B—B in FIG. 9.
Figure 10:
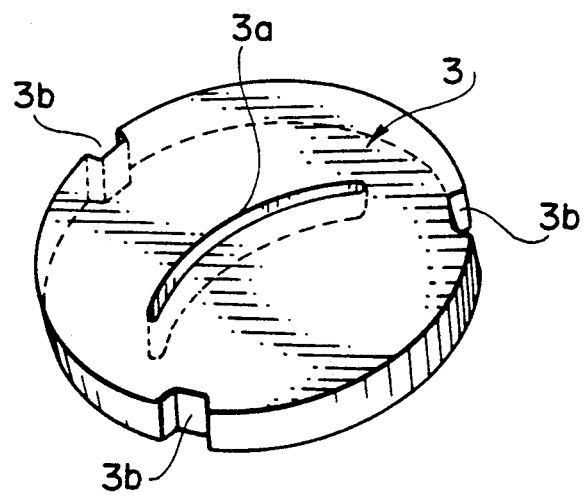
FIG. 10 is a perspective view of the centering member used in the apparatus shown in FIG. 8.
Figure 11:
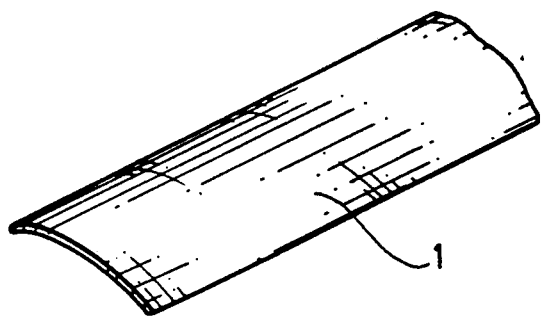
FIG. 11 is a partially perspective view of a moving member used in the same apparatus.
Figure 12:
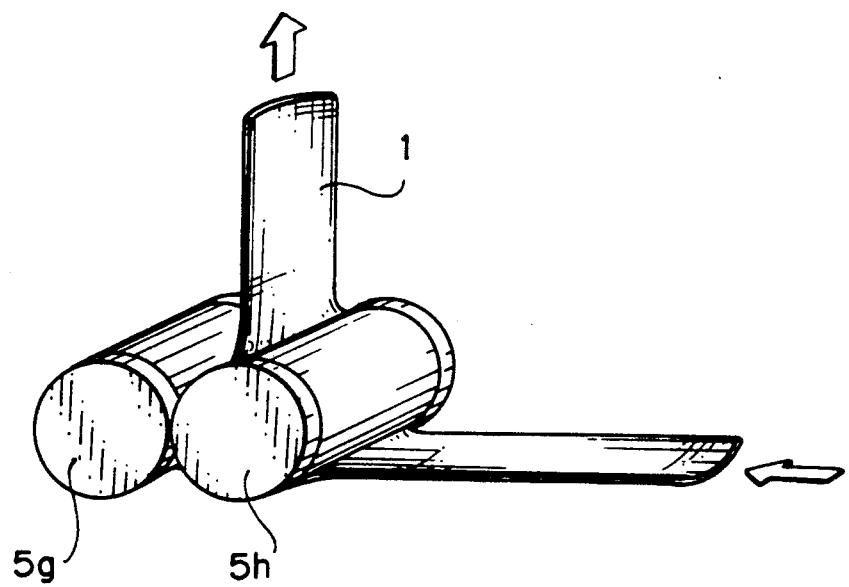
FIG. 12 is a perspective view of a driving portion.
Figure 13:
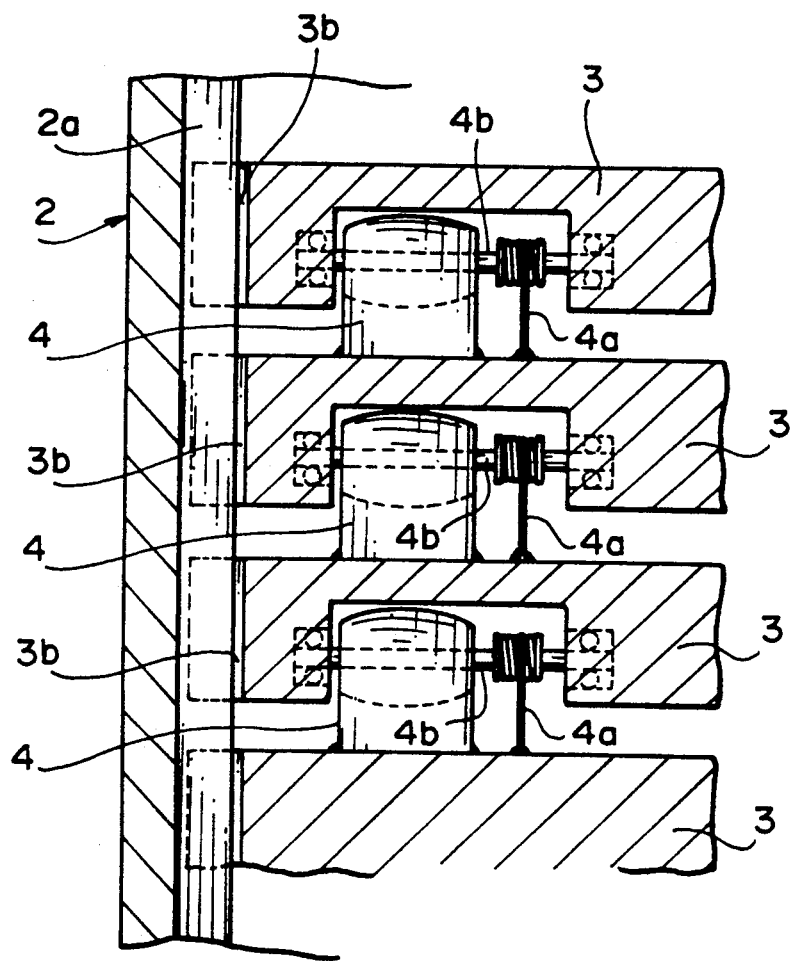
FIG. 13 is a partially enlarged sectional view showing the relation between the centering members and the connecting string when a passage is contracted.
Figure 14:
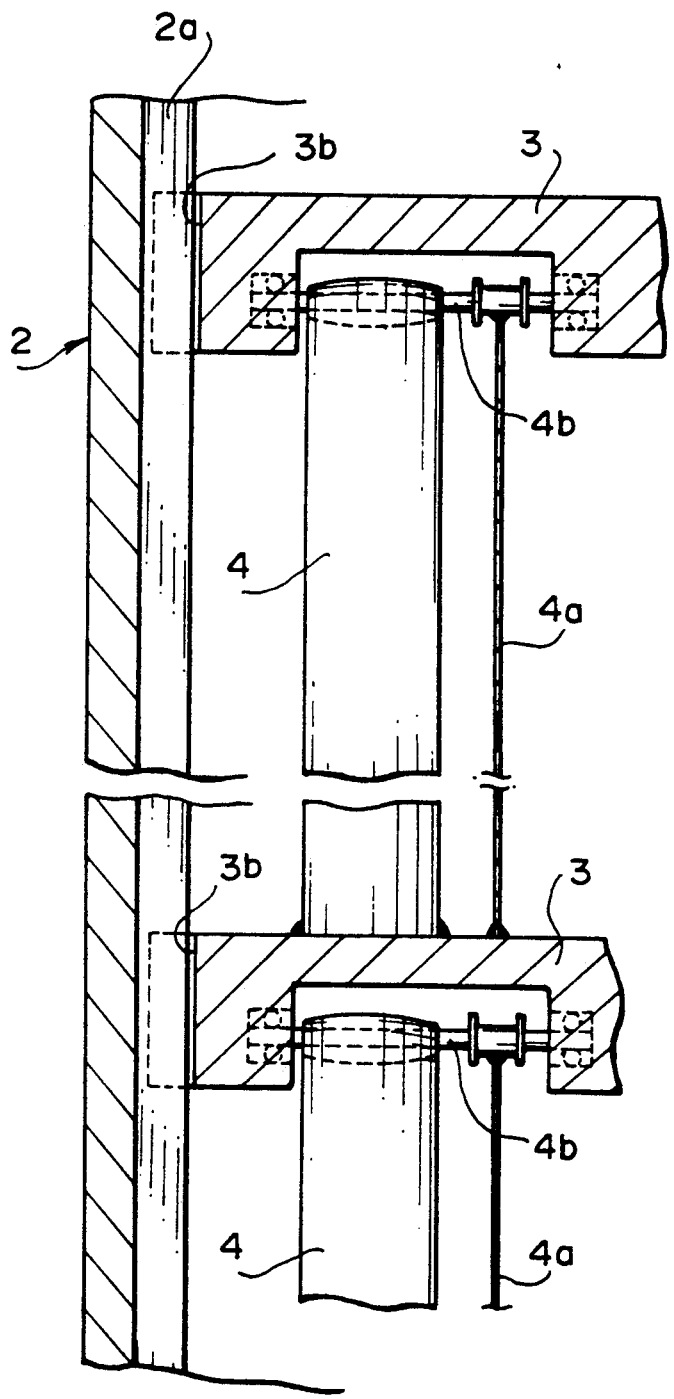
FIG. 14 is a partially enlarged sectional view showing the same relation when the passage is extended.

Embodiments of the present invention are described below with reference to the drawings. FIG. 1 is a sectional view partially showing an upward state of a load lifting mechanism formed by using an embodiment of a mechanism of the invention. FIG. 2 is a front view showing a principal portion of an example of the flexible screw and the nut member used in a mechanism of the present invention. FIG. 3 is a sectional front view of another embodiment. FIG. 4 is a front view of another example. FIG. 5 is a sectional view showing a principal portion of an embodiment of a mechanism of the present invention in the state wherein a telescopic column is extended. FIG. 6 is a sectional view of the same embodiment in the state wherein the telescopic column is contracted. FIG. 7 is a sectional view taken along line A—A in FIG. 5. FIG. 8 is a sectional front view of a telescopic column formed by another embodiment of a mechanism of the invention. FIG. 9 is a sectional view taken along line B—B in FIG. 8. FIG. 10 is a perspective view of the centering member used in the apparatus shown in FIG. 8. FIG. 11 is a partially perspective view of the moving member used in the same apparatus. FIG. 12 is a perspective view of a driving portion. FIG. 13 is a partially enlarged sectional view showing the relation between the centering members and the connecting string in the mechanism shown in FIG. 1 when a passage is contracted. FIG. 14 is a partially enlarged sectional view showing the same relation when the passage is extended.

The principle of a mechanism of the invention is described below with reference to FIG. 1. In the present invention, a slender moving member 1 supports a load W vertically (Z-axis direction) applied to the member 1 and holds the buckling strength of the mechanism.

It is found that if the Euler's equation for long column (long member) is applied, the buckling strength of a long column is inversely proportional to the square of the length. The object of the present invention to obtain a movement mechanism having predetermined buckling strength using a slender member cannot be thus achieved unless an intermediate portion of the moving member 1 is supported. In the present invention, attention is paid to this point, and an intermediate portion of the slender moving member in a movement passage 2 is supported with an appropriate pitch. Centering members 3 are used for supporting the intermediate portion of the moving member 1. The term "supporting" represents that the moving member is supported so as not to produce a positional deviation (displacement) of the moving member in the direction (X-Y plane) vertical to the load in coordinates.

The movement passage 2 shown in FIG. 1 supports and guides the centering members 3 moved and arranged with a an appropriate pitch. Since the centering member 3 are connected to each other through connecting strings 4, 4a (refer to FIGS. 13 and 14), the centering members 3 are moved in the passage 2 synchronously with the forward or backward movement of the moving member 1 so as to support the member 1 with an appropriate pitch at the center of the passage 2 during forward movement of the moving member 1, and to replace the buckling strength of the moving member 1 by the bucking strength in spans respectively supported by the centering members 3, not in the whole length of the moving member 1.

Each of the centering members 3 is provided with a through hole 3a for loosely passing the long member 1 therethrough and guiding the member 1 at the center thereof, a key way 3b having the function to lock the passage 2, a connecting string 4 comprising a convex flat spiral spring having the self-rewinding force and an auxiliary string 4a for defining the pitch of the centering members 3 and for defining the delivery of the connecting string 4 to the length thereof (refer to FIGS. 13 and 14). The convex connecting string 4 is not drown out for the whole length and is mounted on a shaft 4b together with the auxiliary string 4a in order to ensure the self-rewinding force. Reference numeral 2a denotes a protruding key strip which is provided on the inner surface of the movement passage 2 in correspondence with the key way 3b.

Reference numeral 5 denotes a driving portion for upwardly and downwardly moving the moving member 1. The driving portion 5 comprises a rotatable nut member when the moving member 1 is a screw, a rotatable feed driving roll when the moving member 1 is a string or band, and a rotatable pinion when the moving member 1 is a rack.

Even if the moving member 1 is an inflexible member, the movement mechanism of the present invention can be applied. When the moving member is an inflexible member, the mechanism of the present invention can realize a feed screw mechanism or a screw jack having a longer feed stroke and higher lifting stroke by using a screw moving member longer and thinner than that of a conventional feed screw mechanism using a rigid screw rod or a screw jack using a rigid screw rod.

However, if the moving member 1 is inflexible, it is necessary to ensure a space for the moving member 1 at the rear end of the movement passage. If the movable member 1 is a flexible member, a take-up portion such as a reel or the like is provided at the end of the movement passage so that the space can be saved. An embodiment of the movable mechanism off the present invention which uses the flexible moving member 1 is described below.

FIG. 2 shows an example of a feed screw mechanism which uses as the flexible moving member 1 a flexible screw (denoted by reference numeral 1 hereinafter). As shown in FIG. 2, the flexible screw 1 comprises a steel linear material 1a which is closely wound into a long coil and has, for example, a thread groove 1b for transferring balls which is formed on the outer periphery along the junction line of the linear material to form an example of the flexible moving member of the present invention. Although the example shown in FIG. 2 uses the linear material 1a having an outer surface which is previously processed for forming a thread groove so that the thread groove 1b is formed when the linear material 1a is wound into a coil, the linear material 1a may have an appropriate angular sectional form such as a rectangular form, a trapezoidal form or the like.

Although the flexible screw 1 formed as described above has substantially the same appearance as that of a screw formed by a usual rod member, the flexible screw 1 has flexibility in the axial direction thereof because it is formed by winding the linear material 1a into a coil.

In FIG. 2, a rotatable nut member into which the flexible screw 1 is screwed functions as the driving portion 5. The nut member comprises a short cylindrical nut body 5a having an opening with a diameter into which the flexible screw 1 loosely inserted, and many balls 5b which are helically disposed along the thread groove 1b in the inner surface of the nut body 5a and which are circulated in the nut body 5a. Reference numeral 5c denotes an external gear provided as a flange on the outer periphery of the nut body 5a so as to input rotational force from the outside thereof.

Although the nut member comprises a ball nut having the balls 5b, the nut member 5a in which a male screw (not shown) engaging with the screw groove 1b of the flexible screw 1 is helically provided directly on the inner surface thereof, or the nut member 5a in which a helical string member (not shown) formed into a helical string using an appropriate synthetic resin material and fitted to the inner surface of the nut body 5a in place of the balls 5b and the male screw may be used for the flexible screw 1 used in the present invention. The material for the string member is an appropriate metal, ceramic or a composite material thereof other than the synthetic resin.

Since the flexible screw 1 formed by winding the linear material into a coil to form a long moving member is hollow, a core body (not shown) may be inserted into the flexible screw 1 in close contact with the inside thereof. An example of such a core body is a flexible tube (not shown) having a screw-like convex strip engaging with the thread groove formed along the junction line of the linear material 1a in the inner side of the flexible screw 1.

When the core body inserted into the flexible screw 1 is a flexible tube, a fluid may be charged into the tube so that it can be freely supplied and exhausted. This constitution is useful for obtaining the buckling strength when it is desired to wind the whole flexible screw 1 on a reel or the like and draw out the flexible screw 1 to keep it in a straight position. In addition, the core body may be made of a shape memory alloy, and a temperature environment for allowing the memory alloy to return to a linear shape under a certain temperature condition is formed in a portion where the flexible screw 1 wound on a reel or the like is straightened.

Another embodiment of the movement mechanism of the present invention which uses as a movement driving portion 5 the flexible screw 1 which is an example of flexible moving members and the nut member is described below with reference to FIG. 3.

In FIG. 2, the nut member screwed on the flexible screw 1 through the balls 5b is normally and reversely rotated at a predetermined position by transmitting the rotational output of a motor 5d the nut member so as to forwardly and backwardly move the flexible screw 1 which is stopped by winding the rear end 1b thereof in the movement passage 2, as shown in FIG. 3. In FIG. 3, reference numeral 5e denotes an output pinion. These members and the nut member form an example of the movement driving portion 5 of the screw 1.

In FIG. 3, the body 5a of the nut member is rotatably disposed at a predetermined position at the lower end of the movement passage 2 through a bearing 5f or the like. The flexible screw 1 is screwed into the nut member. The rear end 1b of the flexible screw 1 screwed into the nut member is turned at 90° and wound or coiled like a snake immediately below the nut member because of its flexibility, and the front end 1a thereof passed through the nut member is forwardly and backwardly moved in the movement passage 2.

In FIG. 3, each of the centering members 3 is provided so that the flexible screw 1 is movably passed through the central portion thereof. The centering members 3 are connected to each other by coil spring-like connecting string 4 due to the convenience of explanation. However, the centering members are preferably connected to each other by the convex connection 4 having the self-rewinding force and the auxiliary string 4a for defining the length, as shown in FIG. 1.

In the mechanism shown in FIG. 3, a movement object W serving as a load desired to be forwardly and backwardly moved is mounted at the front end 1a of the flexible screw 1 so that the object W can be moved in the movement passage 2 together with the front end of the screw 1 by moving the flexible screw 1 in the movement passage 2.

In this mechanism, the long flexible screw 1 is used for increasing the movement amount of the screw 1 and increasing the lifting amount of the object W. The centering members 3 which movably contact with the outer periphery of the screw 1 at an appropriate pitch are thus disposed for holding the screw 1 over the whole length thereof at appropriate intervals at the center of the passage 2 and for preventing the buckling of the screw 1 which is caused by the load of the object W.

Each of the centering members 3 has a through hole 3a for guiding the flexible screw 1 at the center thereof and is stopped and supported, on the side of the outer periphery thereof, by the movement passage 2 of the screw 1 formed by a wall surface so as to be slidable in the movement direction employing the relation of the key 2a and the key way 3b shown in FIG. 1. A plurality of centering members 3 are suspended and supported in turn below the object W through the connections 4 each having a predetermined length so that they can be moved and arranged at an appropriate pitch in the movement passage 2 by the upward movement of the screw 1. The screw 1 is thus supported at the interval of the centering members in the movement passage 2, without causing the displacement of the center thereof on plane coordinates. This enables the display of the advantage of the mechanism of the invention that there is no danger of buckling the screw 1 due to the load W.

The mechanism shown in FIG. 4 is a modified embodiment of the present invention reverse to the embodiment shown in FIG. 3. In the mechanism shown in FIG. 4, lock means 31 employing the relation between the key and the key way shown in FIG. 1 for the nut member and the movement passage 2 is added to the nut member, When normal and reverse rotations are applied to the flexible screw 1, the nut member is forwardly and backwardly moved in the axial direction of the screw 1 in the movement passage 2. The same reference numerals as those in FIG. 3 denote the same members.

As described above with reference to FIG. 3, in the mechanism of the invention which uses the flexible screw, the center of the screw 1 is supported by the centering members 3 in the movement passage 2 with the front end 1a in the lead of movement on the side to be delivered. In addition, since the flexible screw 1 can be freely forwardly and backwardly moved while being supported at intermediate positions thereof at an appropriate pitch, the movement passage 2 itself is made flexible (movable) by telescopic cylinders 21, 22, . . . as shown as examples in FIGS. 5 and 6, so that the mechanism of the invention can be used as a movement mechanism for an apparats comprising the telescopic movement passage 2 as a telescopic column. An embodiment of the mechanism of the invention comprising the movement passage serving as a column formed by flexible telescopic cylinders is described below with reference to FIGS. 5 to 7. An embodiment of the mechanism of the invention in which the movement passage 2 serves as a column comprising telescopic cylinders is described below with reference to FIGS. 5 to 7.

In FIG. 5, reference numerals 21, 22 . . . respectively denote parts of telescopic cylinders having different diameters, the cylinder 22 having a small diameter being inserted into the cylinder 21 having a large diameter so as to be vertically slidable and undetachable. Although the whole telescopic cylinder which forms the movement passage 2 in the movement mechanism of the present invention is not shown in the drawing, a plurality of cylinders having difference diameters are successively loosely inserted in the same way as the cylinders 21, 22 . . . shown in the drawing to form the telescopic cylinder.

Each of the cylinders 21, 22 . . . of the telescopic cylinder has a bottom plate a, external flanges b, c formed at the upper and lower end thereof and an internal flange d formed at the upper end thereof. The lower end external flange c of the cylinder inserted and the upper end internal flange d of the upper cylinder function to lock the both cylinders. Character e denotes a through hole for the flexible screw 1, which is provided at the center of the bottom plate a of each of the cylinders.

A telescopic column structure comprising the above-described telescopic cylinder comprising a plurality of cylinders inserted in each other so as to be undetachable and employing a feed screw mechanism as movement driving force has been already known. However, in the present situation, this type of conventional telescopic column has a structure in which the feed screw is supported only by the bottom of each of the cylinders and thus does not have a large extension and a high slenderness ratio.

However, in the telescopic movement passage 2 having the mechanism of the invention, i.e., each of the cylinders 21, 22 . . . which form the telescopic cylinder, a plurality of centering members are moved synchronously with the formation of the passage 2 by telescopic movement and disposed at an appropriate pitch for supporting the intermediate portion of the long thin moving member with a short span. The mechanism of the present invention thus enables the formation of a telescopic column having a long moving amount, i.e., a high slenderness ratio, which cannot be realized by prior art. It was also recognized that the telescopic column has buckling strength and flexural rigidity, both of which are sufficient to resist practical use.

As shown in FIG. 7, each of the centering members 3 is the same as that shown in FIGS. 1 and 3 in the point that each centering member 3 has a size which allows it to be closely fitted in the cylinder 21 and that each centering member 3 is provided with key way portions 3b loosely engaged with the key projecting strips 2a formed on the inner surface of the cylinder 21 and a through hole 3a formed at the center thereof so as to loosely pass and guide the flexible screw 1 therethrough. As a matter of course, the centering members 3 fitted in each of the cylinders 21, 22 . . . having different diameters respectively have outer diameters corresponding to the inner diameters of the cylinders 21, 22 . . . . Although not shown in the drawing, it is preferable for practical use that each of the through holes 3a and e for loosely passing the flexible screw 1 comprises a bush made of a material having low sliding resistance or a rotatable bush with a bearing which engages with the flexible screw 1.

In the embodiment shown in FIG. 5, three centering members are fitted in each of the cylinders 21, 22 . . . which component members of the telescopic cylinder. Each of the centering members 3 is connected to the upper centering member 3 through the connecting string 4, and the uppermost centering member 3 is connected to the lower surface of the bottom plate a of a smaller cylinder inserted into the cylinder concerned through the connecting string 4. The number of the centering members 3 provided in a single cylinder can be set to any desired value in view of the length of each of the cylinders and the load to be lifted.

In the above construction, the cylinders 21, 22 . . . of the telescopic cylinder are successively inserted in such a manner that a cylinder having a smaller diameter is loosely inserted into a cylinder having a larger diameter. When the cylinder having a smaller diameter is pulled up by the upward movement of the flexible screw 1, the external flange c at the lower end of that cylinder catches the internal flange b at the upper end of the next cylinder having a larger diameter. The lower ends of cylinders each having a smaller diameter successively catch and pull up the upper ends of cylinders each having a larger diameter to form the movement passage by telescopic motion.

In the mechanism of the present invention shown in FIG. 5, the front end 1a (not shown) of the flexible screw 1 is thus first fixed to the rear side of the bottom plate a of the cylinder having the smallest diameter. Since the bottom plates a of all the other cylinders and the centering members have the though holes e and 3a, respectively, for loosely passing the screw 1 therethrough, the screw 1 is movably supported by the center of each of the cylinders except the uppermost cylinder and passed through the whole telescopic cylinder. Although not shown in FIG. 5, the rear end 1b of the flexible screw 1 is wound on a take-up roll in a mechanism room on which the undermost cylinder is vertically directly mounted. Although not shown in the drawing, it is preferable to provide a pipe for loosely passing the flexible screw 1 therethrough at the center of the uppermost cylinder in place of the centering member.

On the other hand, the nut member is disposed in the mechanism room so that rotation is transmitted from the motor 5d provided with the transmission system shown in FIG. 5. The transmission system can be designed to have any desired structure.

In the above construction, when the motor 5d is normally rotated, and when the rotation is transmitted to the nut member 5a in the state where the cylinders 21, 22 . . . of the telescopic cylinder are not extended, as shown in FIG. 6, the upward movement of the upper end 1b (not shown) of the flexible screw 1 is started by the rotation of the nut member 5a. In the state shown in FIG. 6 wherein the telescopic cylinder is contracted, the centering members 3 in the cylinders 21, 22 . . . are held in layers between the lower side of the bottom plate a of an upper cylinder and the upper surface of the bottom plate a of a lower cylinder.

The upward movement of the flexible screw 1 causes the upward movement of the cylinder having the smallest diameter in the next cylinder having a larger diameter. When the external flange c at the lower end of the cylinder having a smaller diameter reaches the internal flange b at the upper end of the cylinder having a larger diameter, the cylinder having a larger diameter is upwardly moved by the upward movement of the flexible screw 1. The upward movement of the flexible screw 1 causes cylinders having smaller diameters to successively upwardly move cylinders having larger diameters. The thus-extended telescopic cylinder has the movement passage 2 of the screw 1 formed therein and the appearance of a column extended and vertically provided. At the same time, the centering members 3 in each of the cylinders 21, 22 . . . are upwardly moved in a cylinder in which centering members 3 are fitted by the upward movement of the cylinder above the cylinder concerned and placed with equal pitches according to the length of each of the connections 4, 4a.

During the above extension, the flexible screw 1 is vertically upwardly moved by the function of the centering members without producing displacement on the XY plane. The flexible screw 1 is thus supported at a plurality of positions in the intermediate portion thereof at appropriate intervals by the bottom plate a of each of the cylinders and the plurality of centering members 3 disposed in each of the cylinders 21, 22 . . .

When the flexible screw 1 is extended accompanying the upward movement of each of the cylinders 21, 22 . . ., a plurality of the centering members 3 placed in each of the cylinders 21, 22 . . . are successively moved in each of the cylinders and disposed with an appropriate pitch in each of the cylinders 21, 22 . . . This significantly increases the buckling strength of the whole flexible screw 1. In this case, each of the cylinders must be formed in a member having a thickness and diameter which are sufficient to bear the lateral load. However, since the flexural rigidity of a cylinder is proportional to the cube of the diameter and to the thickness, this purpose is achieved by using a cylinder having a relatively small thickness and a relatively large diameter within a range which produces no local buckling, resulting in a decrease in the total weight.

When the column formed by the extended cylinders 21, 22 . . . , i.e., the movement passage 2 formed by telescopic motion, is contracted and stored, the nut member 5d is rotated in the direction reverse to that of upward movement so that the front end 1a of the flexible screw 1 is downwardly moved, and the flexible screw 1 is wound on the roll in the mechanism room. This causes the cylinders 21, 22 . . . to be successively returned and received in cylinders having larger diameters. When the cylinders are downwardly moved and contracted from the small-diameter side, the centering members 3 in each of the cylinders 21, 22 . . . are moved in each cylinder toward the bottom plate thereof by being pushed down by the bottom plate a of an upper cylinder accompanying with the downward movement of each of the cylinders 21, 22 . . .

In the movement mechanism of the present invention comprising as main members the flexible screw 1 serving as a moving member, the nut member 5d serving as a movement driving source and the centering members 3, the movement passage 2 formed by a plurality of the cylinders 21, 22 . . . which are telescopically provided is formed by telescopic motion in synchronism with the movement of the screw 1. The mechanism of the present invention can thus be utilized as a telescopic column mechanism comprising the telescopic cylinder as a telescopic column. When each of the cylinders 21, 22 . . . of the telescopic cylinder is a cylindrical form, a lock mechanism is formed by the relation between the key and the key way respectively provided on the internal and external surfaces of each cylinder. However, each of the cylinders is an angular form, such a lock mechanism is unnecessary. The outer surface at the lower end of each cylinder and the inner surface at the upper end thereof may be tapered for closely bonding the respective cylinders when the telescopic cylinder is vertically provided as a column by extension.

FIGS. 8 to 12 show another embodiment of a telescopic column having the mechanism of the present invention in which the movement passage 2 is formed by the telescopic cylinders 21, 22 . . . , as shown in FIGS. 5 to 7. The mechanism of the present invention shown in FIGS. 8 to 12 is different from the mechanism of the above embodiment in the point that a convex member (refer to FIG. 11) is used as the moving member 1.

Since the mechanism shown in FIGS. 8 to 12 has the movement driving portion 5 having a construction different from that of the above embodiment because the convex moving member is used as the moving member 1.

Namely, the movement driving portion 5 comprises, for example, a driving roller 5g and a pinch roller 5h opposing the driving roller 5g for pinching the convex moving member 1 therebetween and for forwardly and backward moving the member 1. Reference numeral 5i denotes a guide roller. The driving portion 5 may be formed in another type, for example, a catercolumn belt type.

In addition, in the mechanism shown in FIGS. 8 to 12, the shape of the through holes 3a formed at the center of each of the bottom plates a of the cylinders 21, 22 . . . and the centering members 3 corresponds to the sectional form of the moving member 1. However, since the other portions are the same as those in the mechanism shown in FIGS. 5 to 7, the other portions are not described below. Since the operation and function of the mechanism are substantially the same as those of the mechanism shown in FIGS. 5 to 7, they are not described below.

As described above, in the movement mechanism of the present invention, the movement passage formed by, for example, the telescopic cylinder is designed so as to have flexural rigidity required for a slender structure, and the moving member, e.g., the flexible screw, moving in the movement passage is designed so as to have buckling strength to the weight of the cylinder, the dead weight of the flexible screw and a load of an illuminating lamp or the like, which is loaded on the top of the telescopic column and axially applied thereto.

In this way, the movement passage and the moving member respectively have the flexural rigidity and the buckling strength which are required for a slender structure. For example, a plurality of centering members slidable in the axial direction of the cylinders and each having a through hole for the flexible screw at the center thereof are provided in each of the cylinders which form the movement passage and are connected by, for example, a flat spiral spring and a string, so that the centering members interlock the movement of the flexible screw and are disposed at predetermined intervals when the telescopic column is extended. The buckling strength of the moving member, e.g., the flexible screw, can thus be significantly increased by the function of the centering members, as compared with the case without the centering members.

This is because since the buckling strength of a slender structure is reversely proportional to the square of the length of the structure, as generally known, the length of the flexible screw related to the buckling strength approximates the distance between the respective centering members, not the whole length of the screw, by virtue of the centering members for securing the movement passage for the flexible screw at the center of each of the cylinders having sufficient flexural rigidity. This fact was experimentally confirmed by the inventors.

A simple example is described below. Although the permissible lifting load of a screw jack having a general trapezoidal screw decreases as the length of a screw rod increases if the diameter of the screw rod is the same, the provision of the movement passage and the centering members of the present invention enables a permissible lifting load to be kept constant regardless of the length of the screw rod.

When a flexible movable member is used, the present invention has the great advantage that a long telescopic column can be formed by winding or delivering any one of the various moving members used in the above embodiments. However, since the flexible moving member generally has lower buckling strength than that of rigid moving members, the bucking strength must be increased by employing the structure of the present invention.

As described above, in the mechanism of the present invention, the movement passage and the moving member respectively have the flexural rigidity and the buckling strength, and the buckling strength can be further increased by combination with the movable centering members. It is thus possible to realize an ideal long telescopic column having a high extension ratio, a light weight and a large loadable weight.

What is claimed is:

1. A movement mechanism of a telescopic column comprising:
   a slender moving member;
   a driving portion for forwardly and backwardly moving said moving member;
   a plurality of centering members each having a through hole for said moving member at the center thereof, said centering members being connected to each other and moving with the movement of said moving member so that the distance between said respective centering members can be changed; and
   a movement passage for supporting and guiding the movement of said centering members.

2. A movement mechanism according to claim 1, wherein said moving member is a flexible screw formed by winding a linear material having an appropriate sectional form into a coil and having a thread groove formed in the outer surface thereof.

3. A movement mechanism according to claim 2, wherein said movement driving portion for said moving member comprises a nut member which is rotated by engagement with said thread groove of said flexible screw.

4. A movement mechanism according to claim 1, wherein said moving member is made of a band plate, a linear material, or a stranded wire which has an appropriate sectional form, and said driving portion for moving said moving member comprises a pair of rolls or catercolumn belts.

5. A movement mechanism according to claim 4, wherein said movable member comprises a flexible band material having a flat, convex or concave sectional form.

6. A movement mechanism according to claim 1, wherein said moving member comprises a stepped rack, and said driving portion for moving said movable member comprises a pinon.

7. A movement mechanism according to claim 1, wherein a key and a key groove are respectively provided on each of said centering members and on said movement passage for supporting and guiding the movement of said centering members so as to prevent relative rotation therebetween.

8. A movement mechanism according to claim 1, wherein said centering members are connected to each other by a flat spiral spring, a coil spring or a string or combination of such a spring and a string.

9. A movement mechanism according to claim 1, wherein a flexible movable member is wound and stored when being backwardly moved and is delivered or pulled out when being forwardly moved.

10. A movement mechanism according to claim 1, wherein said movable member comprises a screw rod having a thread groove having an appropriate sectional form such as a round screw, a square thread, a trapezoidal thread or in the outer surface thereof and is moved by rotating a nut member which engages with the thread groove of said screw rod.

11. A movement mechanism according to claim 10, wherein said moving member comprises a screw rod formed by winding a linear material having an appropriate sectional form in a coil on a core rod having an appropriate sectional form or a plurality of core wires.

12. A movement mechanism for a telescopic column comprising:
   longitudinal support means for providing longitudinal support for the column;
   plural lateral support means movable along the longitudinal length of said longitudinal support means for preventing buckling of said longitudinal support means when subjected to longitudinal pressure;
   connecting means for connecting said plural lateral support means to each other so that movement of one of said lateral support means affects movement in an adjacent one of said lateral support means; and
   peripheral guide means surrounding said longitudinal support means for guiding the movement of said lateral support means.

* * * * *